US 6,629,805 B1

(12) United States Patent
Eischeid

(10) Patent No.: US 6,629,805 B1
(45) Date of Patent: Oct. 7, 2003

(54) HARD METAL DRILL BIT FOR USE ON A DRILL

(76) Inventor: Karl Eischeid, Schulweg 23, D-51766 Engelskirchen (DE)

(*) Notice: Subject to any disclaimer, the term of this patent is extended or adjusted under 35 U.S.C. 154(b) by 0 days.

(21) Appl. No.: 09/807,568
(22) PCT Filed: Oct. 28, 1999
(86) PCT No.: PCT/EP99/08195
§ 371 (c)(1),
(2), (4) Date: Jun. 5, 2001
(87) PCT Pub. No.: WO00/25967
PCT Pub. Date: May 11, 2000

(30) Foreign Application Priority Data
Oct. 30, 1998 (DE) .................... 298 19 388 U
(51) Int. Cl.[7] .......................... B23B 51/00; B23B 51/02
(52) U.S. Cl. ........................ 408/228; 408/230
(58) Field of Search ................ 408/226, 227, 408/228, 229, 230, 144, 145, 713; 407/113, 114, 115, 116

(56) References Cited
U.S. PATENT DOCUMENTS 4,209,275 A * 6/1980 Kim .................... 408/211
4,561,813 A * 12/1985 Schneider .................. 408/228
4,602,900 A * 7/1986 Arpaio, Jr. et al. ........ 408/230
4,968,193 A * 11/1990 Chaconas et al. .......... 408/211
5,273,380 A * 12/1993 Musacchia .............. 408/227

FOREIGN PATENT DOCUMENTS

| DE | 19734094 | 5/1998 |
| EP | 0761927 | 3/1997 |
| EP | 0836919 | 4/1998 |

* cited by examiner

Primary Examiner—Henry W. H. Tsai
(74) Attorney, Agent, or Firm—Pandiscio & Pandiscio

(57) ABSTRACT

The invention concerns a hard-metal cutting tip for use on a drill, particularly on a rock or concrete drill, including a drill point (3) extending through an axis of rotation of the drill, primary cutting edges (6) that slope downwardly on both sides, each composed of a primary land (4) and a primary flank (5), the primary flank (5) forming at the primary cutting edge (6) a primary lip clearance angle (14) with a plane perpendicular to the axis of rotation. To provide a hard-metal cutting tip that possesses high cutting, feed, bending and breaking strength and wear resistance, especially at its outer regions subjected to high peripheral speeds, the hard-metal cutting tip is realized such that the primary lip clearance angle (14) formed at the primary cutting edge (6) decreases with increasing distance from the drill point (3).

6 Claims, 1 Drawing Sheet

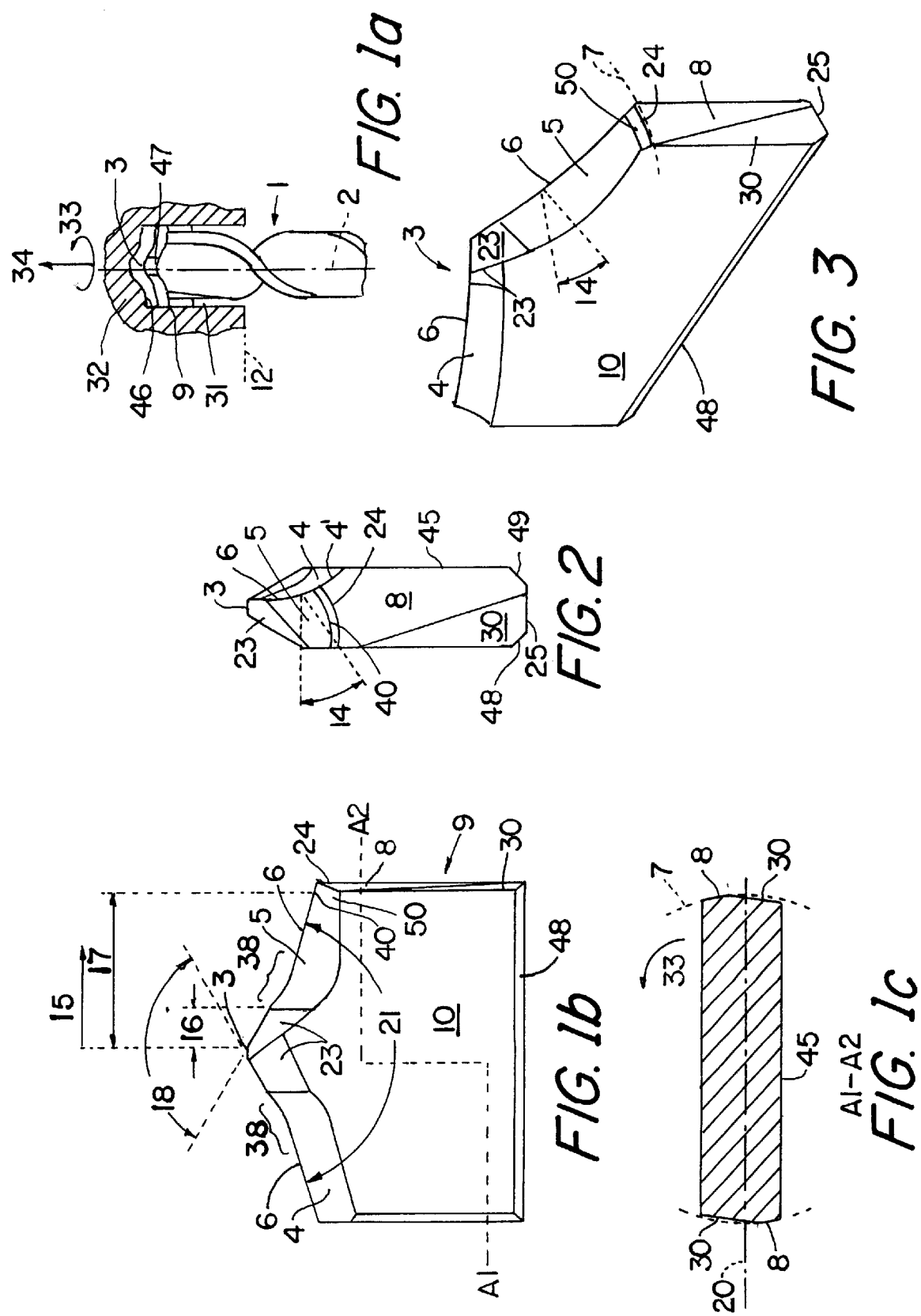

HARD METAL DRILL BIT FOR USE ON A DRILL

BACKGROUND OF THE INVENTION (1) Field of the Invention

The invention relates to a hard-metal cutting tip for use on a drill, particularly on a rock or concrete drill, the cutting tip comprising a drill point for extending through an axis of rotation of the drill, and primary cutting edges that slope downwardly on both sides, each composed of a primary land and a primary flank, the primary flank forming at the primary cutting edge a primary tip clearance angle with a plane of the workpiece perpendicular to the axis of rotation of the drill.

(2) Description of the Prior Art

Known are hard-metal cutting tips for percussion or hammer drills, comprising primary lands and flanks that slope evenly downwardly and primary cutting edges. The drill point is formed by a chisel edge that connects the primary cutting edges. A disadvantage in such cases is that the hard-metal cutting tip is subjected to extreme wear in the outer cutting regions due to the high peripheral speeds. This decreases the service life of the drill. The essential causes of this wear are, on the one hand, the rubbing action of the cutting tip on the working surface, which can cause particles of work material to become welded to the cutting face. These particles break away and roughen the land and the flank. Another cause of wear is diffusion, which, due to the high temperatures produced by the friction, causes metal atoms to migrate from the cutting material into the overflowing chip, thereby weakening the cutting material, which can lead to breakage.

SUMMARY OF THE INVENTION

The object of the present invention is to provide a hard-metal cutting tip that has high cutting, feed, bending and breaking strength and wear resistance, especially at its outer regions subjected to high peripheral speeds.

The object is achieved in that the primary lip clearance angle formed at the primary cutting edge decreases with increasing distance from the drill point.

The presence of a primary lip clearance angle that decreases with increasing distance from the drill point protects the primary cutting edges against wear and breakage, especially at the ends of the hard-metal cutting tip. This makes for a longer service life, which is the period of use of the tool The invention concerns a hard-metal cutting tip for use on a drill, particularly on a rock or concrete drill, comprising a drill point extending through the axis of rotation of the drill, [and] primary cutting edges that slope downwardly on both sides, each composed of a primary land and a primary flank, the primary flank forming at the primary cutting edge a primary lip clearance angle with a plane of the workpiece perpendicular to the axis of rotation of the drill.

Known are hard-metal cutting tips for percussion or hammer drills, comprising primary lands and flanks that slope evenly downwardly and primary cutting edges. The drill point is formed by a chisel edge that connects the primary cutting edges. A disadvantage in such cases is that the hard-metal cutting tip is subjected to extreme wear in the outer cutting regions due to the high peripheral speeds. This decreases the service life of the drill. The essential causes of this wear are, on the one hand, the rubbing action of the cutting tip on the working surface, which can cause particles of work material to become welded to the cutting face. These particles break away and roughen the land and the flank. Another cause of wear is diffusion, which, due to the high temperatures produced by the friction, causes metal atoms to migrate from the cutting material into the outflowing chip, thereby weakening the cutting material, which can lead to breakage.

The object of the present invention is to provide a hard-metal cutting tip that has high cutting, feed, bending and breaking strength and wear resistance, especially at its outer regions subjected to high peripheral speeds.

The object is achieved in that the primary lip clearance angle formed at the primary cutting edge decreases with increasing distance from the drill point.

The presence of a primary lip clearance angle that decreases with increasing distance from the drill point protects the primary cutting edges against wear and breakage, especially at the ends of the hard-metal cutting tip. This makes for a longer service life, which is the period of use of the tool to attainment of a permissible degree of wear. The outer regions of the primary cutting edges, in particular, are severely stressed by the high rotation speeds and the attendant high peripheral speeds. By means of the proposed arrangement, the outer regions can be made to retain their cutting ability for practically as long as the point regions. The drill point region of the hard-metal cutting edge is generally less severely stressed, since the peripheral speed, and thus also the wear, are lower in the central region. The proposed arrangement reduces wear on both the flanks and the lands and the rounding of edges in the outer region of the primary cutting edges. Uniform wear over the full extent of the primary cutting edges ensures that the cutting areas are fully utilized and improves the cost-effectiveness balance. The proposed shape of the primary flank and the primary lip clearance angle can be created as early as in the sintering process and requires no post-processing. For applications involving percussion or hammer drills, the rake is preferably negative and can also be varied along the primary cutting edge in accordance with the lip clearance angle. In this manner, the wedge angle can be kept constant along the primary cutting edge while the lip clearance angle is simultaneously decreased from the drill point to the outer region.

To ensure a uniform cutting, process, it is proposed that the decrease in lip clearance angle be made constant. This prevents the occurrence along the primary cutting edge of stress peaks that increase the likelihood of premature failure of the primary cutting edge at that location.

So that the drill point region is relieved with respect to the primary cutting edge, it is proposed that the decrease in the primary lip clearance angle begin at a defined distance from the drill point. This creates a point region that has a desired width along the primary cutting edge. The width of this region can be determined by the beginning of the decrease in the primary lip clearance angle, and can be varied. This is the region by which the drill head first enters the material, and it centers the drill.

To improve the guidance of the drill in the drillhole, it is proposed that the primary flank transition to a conical transitional face between the primary flank and a narrow-side face, there being a change in the angle of the primary cutting edge at a distance from the drill point. This permits firm guidance of the drill, which is highly desirable especially in the case of very hard materials such as concrete, for example, and reduces the risk of slippage leading to polygonal holes, which can cause excessively large drillholes or even injuries. The proposed arrangement substantially increases the service life of the drill, since wear in this region of the edge can be avoided.

To ensure reliable centering by the centering point and to decrease the force necessary for feed motion, it is proposed that the drill point have a point angle that is smaller than the angle of the primary cutting edges in the vicinity of the transitional face. The same amount of force being applied, this measure results in better penetration of the point into the working surface and simultaneously performs a centering function before the primary cutting edges engage the working surface.

A further improvement of the centering point is achieved by the fact that each primary flank transitions to the drill point by means of a chamfer. This gradual transition from the primary flanks to the drill point reduces the risk of tip breakage and makes the use of relatively hard tips possible. Consequently, even concrete or metal working surfaces can be drilled with long service lives. The centering point makes for a smaller surface area in the core area, the center of the drillhole. This improves drill advance, given the same applied force. The centering point reduces the risk of the drill slipping off center while the hole is being started and furnishes additional guidance. It also prevents the formation of polygonal holes.

To prevent friction during drilling, it is proposed that the small-side face have an outer radius that is adjoined by a flat portion, disposed thereafter in the cutting direction, which broadens with increasing distance from an outer edge. The diagonal elimination of the radius results in effective guidance in the drillhole in the vicinity of the outer edge between the primary flank and the lateral small face, such guidance no longer being necessary in the lower region. The friction surface decreases progressively in that region. This facilitates the cutting motion and decreases the force needed to advance the drillhole. At the same time, because of the decrease in friction during drilling, the material of the cutting tip is not exposed to unnecessarily high temperatures, which again reduces wear of the material due to diffusion or other weakening of the material.

BRIEF DESCRIPTION OF THE DRAWINGS

The invention will be described in further detail with reference to the exemplary embodiment depicted in the drawing, wherein:

FIG. 1a shows a drill with a hard-metal cutting tip,

FIG. 1b shows a hard-metal cutting tip viewed in the direction of the large lateral face, FIG. 1c is a section through FIG. 1b along line A1–A2, FIG. 2 is a side elevation of the hard-metal cutting tip on the small side, and FIG. 3 is a perspective view of the hard-metal cutting tip.

DESCRIPTION OF THE INVENTION

FIG. 1a schematically depicts the basic structure of a drill 1 with a hard-metal cutting tip placed thereon. The drill 1 is preferably a hammer drill or a percussion drill. The drill 1 is shown in a workpiece drillhole 31 inside a workpiece 32 to be machined. The drill 1 has a spiral shape that facilitates the carrying off of material machined from the workpiece drillhole 31. The hard-metal cutting tip comprises a drill point 3 through which the axis 2 of rotation of the drill 1 passes. The hard-metal cutting tip projects at the drill point 3 beyond the end 47 of the drill 1 and at its small sides 9 beyond the outer diameter of the drill 1. The feed motion 34 of the drill 1 proceeds longitudinally to the axis 2 of rotation of the drill 1. The cutting motion 33 of the drill 1 proceeds perpendicularly to the feed motion 34. The cutting motion 33 and the feed motion 34 are therefore borne substantially by the hard-metal cutting tip. The surface 46 of the workpiece 32 being machined that abuts the hard-metal cutting tip has a shape in cross section that corresponds to the profile of the hard-metal cutting tip.

FIG. 1b is an enlarged depiction of the hard-metal cutting tip. The hard-metal cutting tip comprises, at the drill point 3, cutting edges 6 that slope downwardly on both sides and are each composed of a primary land 4 and a primary flank 5. The shank 10 is bounded in its transverse direction 20 by small sides 9 comprising small-side faces 8 and flanks 30. The small-side faces 8 are realized with an outer radius 7, whereas the flanks 30 are flat. Each of the primary flanks 5 transitions to the drill point 3 by means of a chamfer 38. The primary cutting edge 6 is accordingly steeper at this location and the axial forces required for uninterrupted advance movement can be smaller.

The primary flank 5 forms, at least at cutting edge 6, a primary lip clearance angle 14, illustrated in FIG. 2, with the plane 12 perpendicular to the axis of rotation shown in FIG. 1a. This primary lip clearance angle 14 shown in FIG. 2 decreases with increasing distance 15 from the drill point 3. At distance 16, the primary lip clearance angle 14 shown is larger than it is at distance 17. The reduction of the primary lip clearance angle 14 proceeds, for example, from 35° to 10° or 15°. This decrease in primary lip clearance angle 14 is preferably constant. This means that there are no abrupt changes in the primary lip clearance angle 14 at which, for example, stress peaks could develop during drilling. In addition to the decrease in primary lip clearance angle 14 beginning at the defined distance 16 from drill point 3, a change is made in the angle 21 that the primary cutting edges 6 form with each other. Angle 21 varies with increasing distance 15 from drill point 3 to attain a magnitude of 150° radially outwardly on the primary cutting edges 6. The size of angle 21 between cutting edges 6 then changes to 120° beginning at distance 17. The point angle 18 formed at the drill point 3 is also, for example, 120°. It is also feasible, however, to give the primary cutting edges 6 as a whole an angle 21 of 120° to 150° and simultaneously to reduce the primary lip clearance angle 14. The increased rear support of the primary cutting edge 6 during the cutting process and thus the accumulation of material that occurs with a decreasing primary lip clearance angle reduces the risk of tip breakage and premature wear, and makes it possible to use harder and often more brittle hard-metal cutting tips.

At a distance 17, primary flank 5 is bounded by an edge 40, i.e., primary flank 5 transitions to a transitional face 50. Adjoined thereto and to an edge segment 4' is small-side face 8, which is curved at a radius 7. This is illustrated especially clearly by section A1–A2 shown in FIG. 1c.

FIG. 1c shows section A1–A2 taken through the hard-metal cutting tip of FIG. 1b. The longitudinal axis 20 passes along the hard-metal cutting tip. Section A1–A2 passes through the shank 10 of the hard-metal cutting tip from one small side 9 to the other small side 9. Each small side 9 has, in addition to small-side face 8 curved at a radius 7, a flat flank 30. The separation between flank 30 and small-side face 8 runs practically diagonally to small side 9. Consequently, at the lower end of small side 9, in the section taken at A1, a greater portion of flank 30 can be seen than in the section taken at A2 near edge 24 on the other small side 9. The section taken at a higher location, A2, essentially shows a cut through curved small-side face 8 and only a very small portion of flank 30. The small-side faces 8 are the front faces, relative to the cutting motion 33, that contact the workpiece 32. The diagonal separation of faces 30 and 8 ensures firm guidance of the drill 1 in the drillhole 31 near the upper edge 24 of small side 9, while simultaneously minimizing the rubbing of small side 9 against the wall of the drillhole 31.

FIG. 2 is a side elevation of a hard-metal cutting tip providing a view of small side 9. Cutting edge 6 is bounded by primary land 4 and primary flank 5. The primary lip clearance angle 14 of primary flank 5 along cutting edge 6 decreases at the transition from the point face 23 to edge 40. At the bottom edge 25 of small side 9, the edges extending perpendicularly thereto are beveled at a 45° angle, with the resultant faces 48, 49, which are shown again in perspective in FIG. 3, extending toward each other. This shape facilitates the insertion of the hard-metal cutting tip in the drill 1.

FIG. 3 is a perspective drawing of the hard-metal cutting tip. It provides an oblique view of the transitional face 50 by which primary flank 5 transitions to small-side face 8. As is clear from the drawing, the transitional face is bounded by mutually parallel edges 40, 24 provided with radii, causing transitional face 50 to have an obliquely conical shape or the shape of a segment of an envelope of an oblique cone. This obliquely disposed, conical transitional face 50 is a secondary flank relative to the primary flank 5.

What is claimed is:

1. A hard-metal cutting tip for use on a drill (1), the cutting tip comprising a drill point (3) extending through an, axis (2) of rotation of the drill (1), and primary cutting edges (6) that slope downwardly on both sides, each cutting edge being composed of a primary land (4) and a primary flank (5), said primary flank (5) being inclined to a plane (12) perpendicular to the axis (2) of rotation to form a primary lip clearance angle (14), characterized in that the primary lip clearance-angle (14) decreases with increasing distance (15) from said drill point (3), wherein said primary flank (5) transitions to a conical transitional face (50) between said primary flank (5) and a small-side face (8), there being a change in an angle (21) of said primary cutting edge (6) at a distance (17) from said drill point (3), and wherein said small-side face (8) has an outer radius (7) adjoined by a flank (30) that is disposed thereafter in a direction of cutting motion (33) and that broadens with increasing distance from an outer edge (24).

2. The hard-metal cutting tip as recited in claim 1, characterized in that the decrease in said primary lip clearance angle (14) is constant.

3. The hard-metal cutting tip as recited in claim 2, characterized in that the decrease in the primary lip clearance angle (14) begins at a defined distance (16) from said drill point (3).

4. The hard-metal cutting tip as recited in claim 1, characterized in that said drill point (3) has a point angle (1.8) that is smaller than the angle (21) of said primary cutting edges (6) near the transitional face (50).

5. The hard-metal cutting tip as recited in claim 1, characterized in that each of said primary flanks (5) transitions to said drill point (3) by means of a chamfer (38).

6. The hard-metal cutting tip as recited in claim 1, wherein the drill comprises a selected one of a rock drill and a concrete drill.

* * * * *